United States Patent [19]

Royet et al.

[11] Patent Number: 4,947,637

[45] Date of Patent: Aug. 14, 1990

[54] METHOD AND APPARATUS FOR MAKING MULTISTRAND SUPERCONDUCTING CABLE

[75] Inventors: John M. Royet, Oakland; Rollin A. Armer, Orinda, both of Calif.

[73] Assignee: The United States of America as represented by the United States Department of Energy, Washington, D.C.

[21] Appl. No.: 322,875

[22] Filed: Mar. 14, 1989

[51] Int. Cl.$^5$ .................... H01B 13/02; H01B 12/08; D07B 3/06

[52] U.S. Cl. .......................... 57/311; 57/9; 57/13; 57/59; 57/314

[58] Field of Search .................. 57/3, 6, 9, 13–15, 57/59, 293, 294, 311, 314

[56] References Cited

U.S. PATENT DOCUMENTS

| | | | |
|---|---|---|---|
| 2,802,328 | 8/1957 | Ritchie | 57/13 |
| 3,058,867 | 10/1962 | Plummer et al. | 57/13 X |
| 3,234,721 | 2/1966 | Carter | 57/13 |
| 3,396,522 | 8/1968 | Biagini | 57/311 X |
| 3,408,807 | 11/1968 | Sylthe | 57/59 |
| 3,507,108 | 4/1970 | Yoshimura et al. | 57/294 |
| 3,638,154 | 1/1972 | Sampson et al. | 335/216 |
| 3,651,629 | 3/1972 | Webster | 57/13 |
| 4,031,310 | 6/1977 | Jachimowicz | 174/15 C |
| 4,112,660 | 9/1978 | Ferrentino et al. | 57/59 |
| 4,202,722 | 5/1980 | Paquin | 156/436 |
| 4,317,328 | 3/1982 | Allard | 57/59 |
| 4,372,105 | 2/1983 | Ellis, Jr. | 57/204 |
| 4,381,426 | 4/1983 | Cronkite et al. | 174/117 F |
| 4,413,469 | 11/1983 | Paquin | 57/293 |
| 4,450,674 | 5/1984 | Bos et al. | 57/6 |
| 4,492,089 | 1/1985 | Rohner et al. | 62/55 |
| 4,529,837 | 7/1985 | Borden | 174/128 |
| 4,554,731 | 11/1985 | Borden | 29/605 |
| 4,570,432 | 2/1986 | Vogelsberg et al. | 57/293 |
| 4,617,789 | 10/1986 | Borden | 57/6 |

*Primary Examiner*—John Petrakes
*Attorney, Agent, or Firm*—L. E. Carnahan; Roger S. Gaither; William R. Moser

[57] ABSTRACT

Improved multistrand Rutherford-type superconducting cable (42) is produced in a flattened form with two layers of helically wound strands (33) and in which the strands are alternately twisted about their lengths equally and in opposite directions to provide a flat cable with improved stability. In particular, the cable (42) is made by guiding multifilament wire strands (33) from spools (32) on a rotating turret (11) to a fixed tapered forming mandrel (22) where they are wound diagonally around the mandrel and then rolled into a flattened shape. The spools (32) are located around the periphery of the turret (11) and are rotatable about axes in a plane parallel to the turret (11) to unroll the wire. Sprocket assemblies (48 and 49) are driven by drive chains (68 and 76) to rotate alternate spools (32) equally and in opposite directions relative to the forming mandrel (22) so that the wire strands (33) are twisted prior to being wound on the mandrel (22). The rate of rotation of the spools (32) in one direction is different than the rate of rotation of the spools (32) in the opposite direction to compensate for the rate of rotation of the turret (11) so that all strands (33) have the same degree of twist about their lengths.

11 Claims, 4 Drawing Sheets

METHOD AND APPARATUS FOR MAKING MULTISTRAND SUPERCONDUCTING CABLE

BACKGROUND OF INVENTION

This invention relates to multistrand Rutherford-type superconducting cables and more particularly to an improved method and apparatus for making such cables. The U.S. Government has rights to this invention pursuant to contract No. DE-AC03-76SF00098 between the U.S. Department of Energy and the University of California.

Superconducting magnet coils have been developed over many years to provide coils that can establish a very high magnetic field at cryogenic temperatures without going normal (losing its superconductivity). Higher temperatures and too high a current in a conductor can cause such change to normal, and the Rutherford-type cable has been developed to provide a superconducting array of conductors that achieve the desired result. Rutherford-type cable was named after the Rutherford Laboratory in England which first produced such cable.

One of the features of the Rutherford-type cable is that it is made from a plurality of strands of wire, each containing from several hundred to several thousand filaments of superconducting material carried in a metal matrix. Another feature of such cable is that the strands are arranged so as to not be parallel to the length of the cable, because such geometry can reduce the current obtainable without causing the superconducting filaments to go normal.

Rutherford-type cable is made by winding or twisting a plurality of superconducting strands helically around an elongated tapered forming mandrel to form a semi-finished, generally cylindrical cable having a hollow core. The hollow core cable is then moved axially from the mandrel to pressure rollers which flatten the cable into a flat multistrand ribbon with two layers of strands having two generally flat sides and two edges. A more complete description of making a typical Rutherford-type cable is found in U.S. Pat. Nos. 4,529,837 and 4,617,789, issued Jul. 16, 1985, and Oct. 21, 1986, to Albert R. Borden.

Such cable is used in making of coils which provide high magnetic fields for use in magnetic confinement of fusion or for guiding beams of synchrotron accelerators. A typical example of such a coil is found in U.S. Pat. No. 4,554,731, issued Nov. 26, 1985, to Albert R. Borden. As is well known in the art, it is important to provide precision placement of the coil to achieve the desired results. Accordingly, it is important to have a cable which may be easily and accurately fabricated into the desired coil.

A significant problem with existing Rutherford-type cables is that the helical twists which are necessary to provide a desired cable also make the cable difficult to handle and use because of the tendency of the cable to form itself into a spiral shape.

SUMMARY OF THE INVENTION

It is the primary object of the invention to provide a helically-wound Rutherford-type cable which retains all of the requirements of superconductivity while retaining a flatter configuration when in a relaxed condition.

Additional objects, advantages and novel features will be set forth in the description which follows, and in part will become apparent to those skilled in the art upon examination of the following, or may be learned by practice of the invention. The objects and advantages of the invention may be realized and attained by means of the instrumentalities and combinations pointed out in the appended claims.

To achieve the foregoing and other objects, and in accordance with the present invention, as described and broadly claimed herein, an improved method of making multistrand Rutherford-type cable is provided in which a plurality of wire strands are helically wound in a single layer around a forming mandrel and then flattened, and wherein selected of the strands are twisted in one direction and selected of the strands are equally twisted in the opposite direction, with the twisting being done prior to winding the strands around the mandrel, so that the twisting forces in the finished cable are substantially cancelled.

A further aspect of the invention lies in the provision of an apparatus enabling the above method to be carried out, and in which the apparatus includes a rotatable turret having around the periphery thereof a plurality of spool holders for holding a desired number of spools of wire and guide means for guiding the wire strands from the spools to a forming mandrel spaced axially from the turret, and in which the spool holders and spools are rotated about axes parallel to the turret axis to twist the wire strands in desired directions.

BRIEF DESCRIPTION OF THE DRAWINGS

The accompanying drawings, which are incorporated in and form part of the application, together with the description, serve to explain the principles of the invention.

DESCRIPTION OF THE PREFERRED EMBODIMENT

Figure 1:
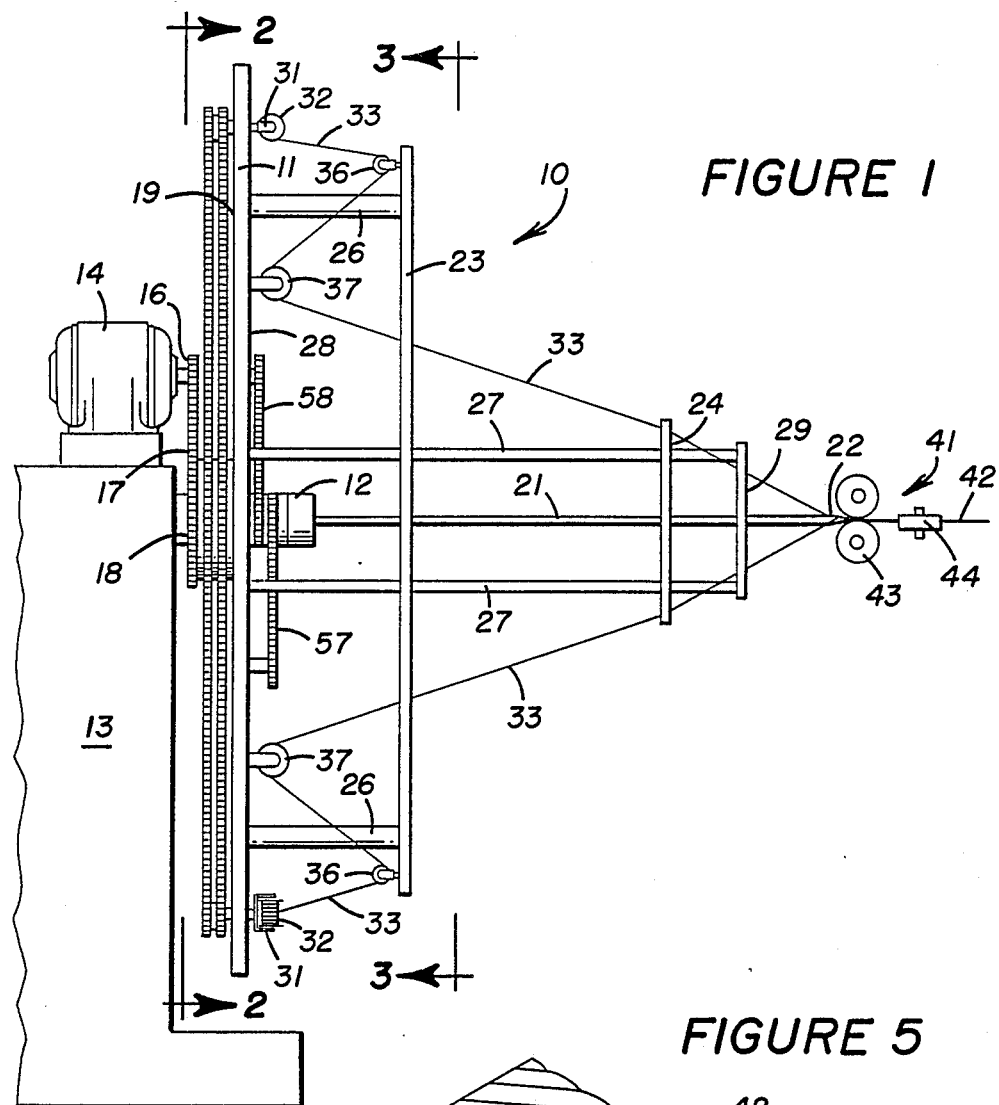
FIG. 1 is an elevational and simplified view of an apparatus for making multistrand cables in accordance with the present invention.

Referring now to the drawings, wherein a preferred embodiment of the invention is illustrated, the cable forming apparatus 10 comprises a generally planar turret 11 mounted for rotation on a support shaft 12 which is fixed to and projects horizontally from stationary frame 13. The turret is rotatably driven by motor 14 that is connected by sprocket 16 and chain 27 to sprocket 18, the latter being fixed to the back side 19 of turret 11.

A fixed mandrel 21 extends from shaft 12 and has a tapered forming end 22 positioned axially of and spaced from turret 11.

Turret 11 carries therewith rings 23 and 24, mounted on support rods 26 and 27 respectively, and the rings being spaced from the front side 28 of turret 12 as shown in FIG. 1. A guide plate 29 is also mounted on support rods 27 and is located between ring 24 and the tapered mandrel end 22.

Turret 11 also carries therewith a plurality of U-shaped spool holders 31 spaced peripherally around the front side of the turret, each spool holder 31 being adapted to hold a spool 32 of a wire strand 33, the spools 32 being rotatable in the spool holders 31 about axes in a plane parallel to the plane of turret 11 to unwind the wire strands 33 therefrom.

Figure 2:
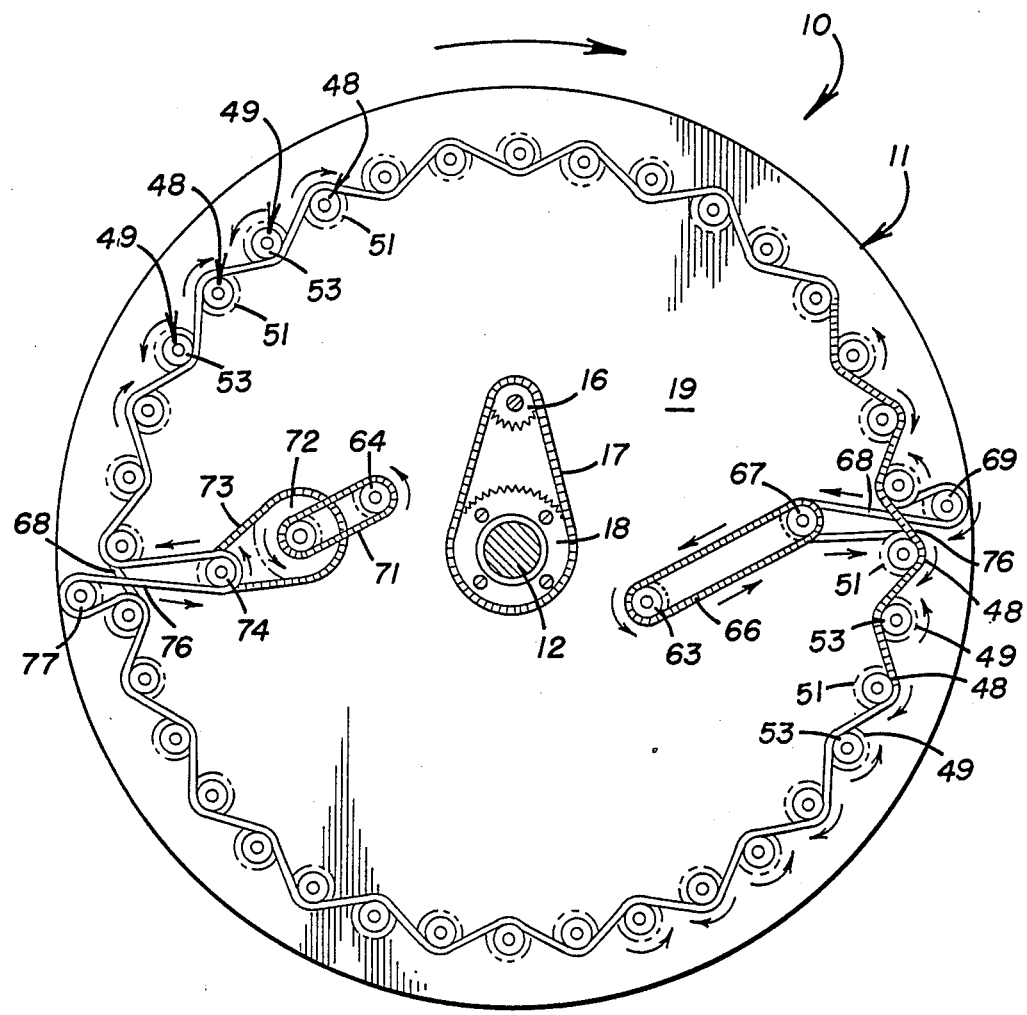
FIGS. 2 and 3 are views of the opposite sides of the turret of the apparatus of FIG. 1, taken on lines 2—2 and 3—3 thereof.

For purposes of simplicity, only two spool holders 31 and spools 32 are shown in FIG. 1. However, it is to be understood that there are many other such spool holders and spools on the turret, i.e. as shown in FIG. 2, which shows, for example, a total of 36 spool holders and 30 spools.

Each wire strand 33 passes over a pulley 36 on ring 23 and back to and around a conventional magnetic wire brake 37 and then through openings (not shown) in ring 24 and guide 28 so that the wire strands are guided from the wire spools 32 to the fixed and tapered forming mandrel end 22. The rotation of turret 11 will wind the strands 33 helically and in a single layer around the forming mandrel. The helically wound strands are then pulled axially from the mandrel and presented to a conventional Turks head station 41 where they are flattened into a cable 42. The Turks head station 41 includes a first pair of rollers 43 to flatten the cable in one direction and a second pair of rollers 44 to guide and flatten the cable in another direction. The operation of such a station is well known and the details thereof form no part of the present invention.

As mentioned above, the wire strands 33 will each be twisted about its length by rotation of the turret 11, rings 23 and 24 and guide 28 as they are played out from the spools 32 and gathered on the fixed mandrel end 22. In prior systems, this twist was the only twist and it was provided equally, and in the same direction, to all of the strands.

Figure 4:
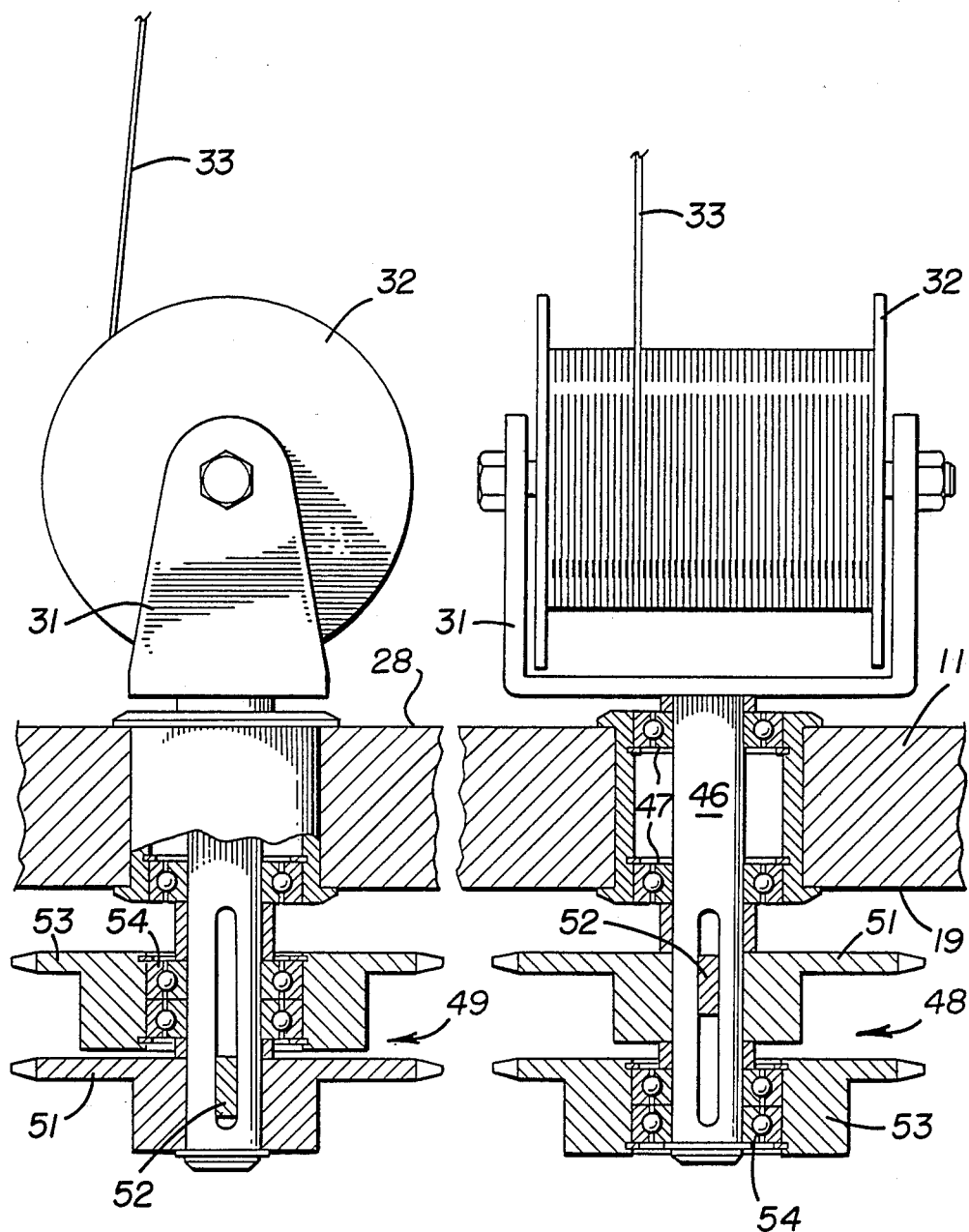
FIG. 4 are sectional views of the spool holders, taken on line 4—4 of FIG. 3.

In accordance with the present invention, the spool holders 32 are each separately mounted on turret 11 for rotation about axes parallel to the axis of turret 11, as more fully shown in FIG. 4. Each U-shaped spool holder 32 is fixed to a shaft 46 which is parallel to the axis of the turret and extends therethrough, the shaft being journaled for rotation relative to turret 11 by ball bearings 47. Each shaft carries a sprocket assembly 48 or 49, each including a drive sprocket 51 secured to the shaft by a key 52 and an idler sprocket 53 rotatably mounted on the shaft by ball bearings 54. In the sprocket assemblies 48, mounted on every other shaft 46, the drive sprocket 51 is located closer to turret 11 than is the idler sprocket 53. The other sprocket assemblies 49 have the reverse order of the drive and idler sprockets.

Figure 3:
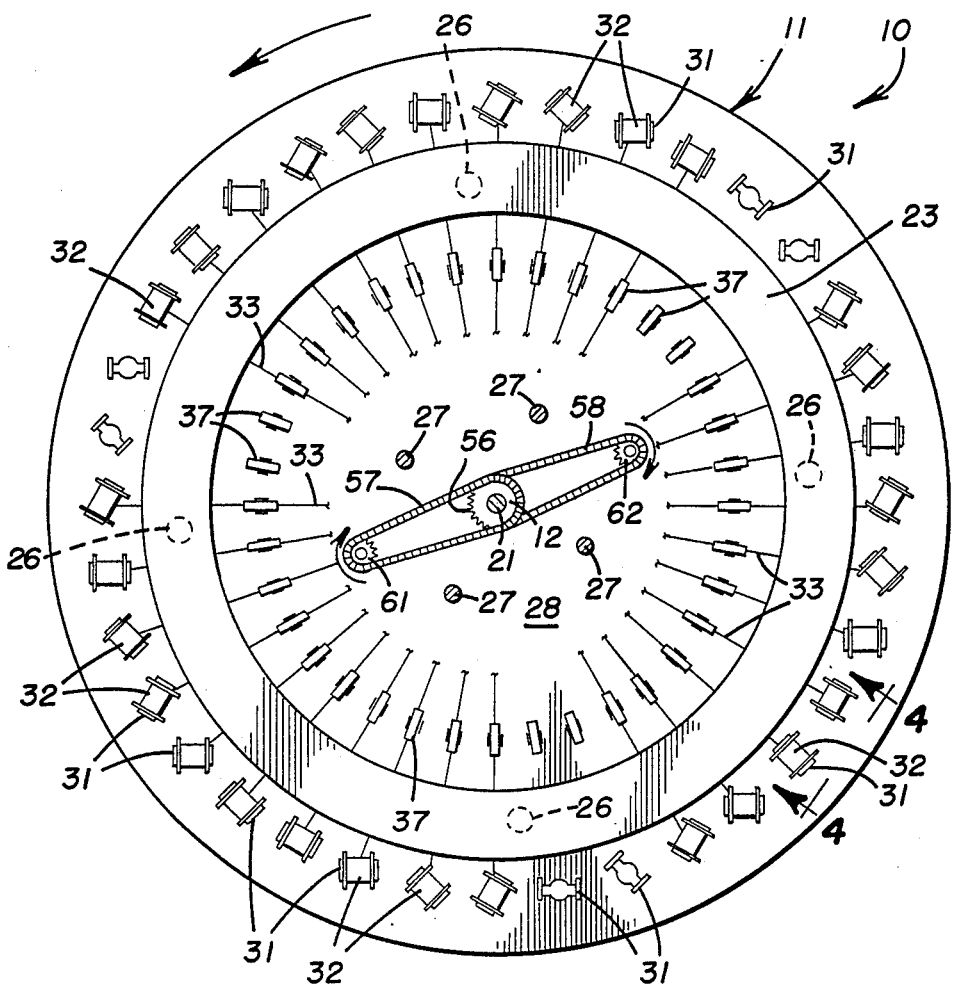

As seen in FIGS. 1 and 3, the support shaft 12 has a double sun sprocket 56 thereon which is connected by chains 57 and 58 to a pair of planet sprockets 61 and 62 on the front side 28 of turret 11. The planet sprockets 61 and 62 are fixed shafts journaled through turret 11, which shafts also have fixed thereto sprockets 63 and 64 on the back side of turret 11. As viewed from the front side of the turret, i.e. as in FIG. 3, counterclockwise rotation of turret 11 will cause the planet gears 61 and 62 to rotate in a clockwise direction relative to the turret. When viewed from the back side of the turret, i.e. FIG. 2, the turret is rotating in a clockwise direction and the two sprockets 63 and 64 will be rotating in a counterclockwise direction relative to the turret.

The rotation of sprocket 63 is coupled by chain 66 to double sprocket 67 and thus to endless drive chain 68 which is trained around idler sprocket 69 and around all of the sprocket assemblies 48 and 49 on the turret, the drive chain being trained around the outside of all of the drive sprockets 51 of the sprocket assemblies 48 and around the inside of the idler sprockets 53 of all of the sprocket assemblies 49. Thus, as viewed in FIG. 2, drive chain 68 will cause all of the sprocket assemblies 48 on the turret, and the spool holders 31 thereon, to rotate in a clockwise, or right handed direction relative to the fixed shaft 12 and the fixed mandrel 21 extending therefrom.

The rotation of sprocket 64 is coupled by chain 71 to double sprocket 72 and then by chain 73 to double sprocket 74 and thus to endless drive chain 76 which is trained around idler sprocket 77 and around all of the sprocket assemblies 48 and 49. In this case, drive chain 68 is trained around the outside of the drive sprockets 51 of all of the sprocket assemblies 49 and around the inside of the idler sprockets 53 of all of the sprocket assemblies 48. Thus, as viewed in FIG. 2, the drive chain 76 will travel around all of the sprocket assemblies 48 and 49 in the same direction as drive chain 68, but will cause all of the sprocket assemblies 48, and the spool holders 31 thereon, to rotate in an counterclockwise, or left handed direction relative to the fixed shaft 12.

The double sprocket 72 acts as a speed increaser to cause the drive chain 76 to be driven at a faster linear speed than drive chain 68, so that the left hand rotation of the sprocket assemblies 49 relative to turret 11 is faster than the right hand rotation of the sprocket assemblies 48 relative to turret 11. The total right hand twist, relative to mandrel 21, on each of the wire strands from the spools carried in the spool holders connected to the sprocket assemblies 48 will be a function of the right hand rotation of the sprocket assemblies 48, plus the right hand rotation of turret 11. The total left hand twist, relative to the mandrel 21, on each of the other wire strands will be a function of the left hand rotation of the sprocket assemblies 49 minus the right hand rotation of turret 11. The drive train ratios from the sun sprocket 56 to the two drive chains 68 and 76 are chosen so that the total right hand and left hand twists, relative to the fixed mandrel 21 are equal.

In the use of the present invention, the size and number of strands 33 to be made into a cable is first determined. A mandrel 21 having a tapered forming end 22 of a size to accommodate the strands and form a tight cable is selected and secured to shaft 12. The required number of spools 32 are placed in spool holders 31 with their location chosen so that each spool will be rotated in a direction opposite to the rotation of the adjacent spools. The Turks head station 41 is adjusted and the strands are brought thereto to provide a beginning position. The machine is then turned on and the cable 42 is made automatically, with the rotation of turret 11 providing the helical winding of the strands onto the forming mandrel and with the oppositely rotating spool holders providing equal amounts of right hand and left hand twists to the individual strands.

Typically, the spools 31 will each contain about 5,000 feet of wire and will require a 10½ inch diameter circle for rotation by the sprocket assemblies 48 and 49.

Figure 5:
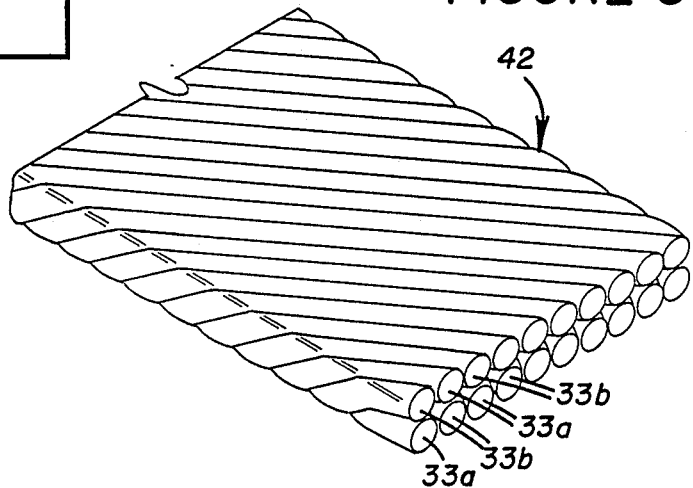
FIG. 5 is a perspective view of a multistrand cable made on the apparatus of FIG. 1.

FIG. 5 shows a cable 42 made in accordance with the present invention. In this particular example, the cable 42 is made from 20 strands, with half of the strands, 33a, having right hand twists about their lengths and the other half, 33b, having right hand twists about their lengths. As is seen in FIG. 5, the strands 33a are nearly surrounded by strands 33b, and vice versa. This provides a stable structure for the cable so that it does not tend to form itself into a spiral shape when relaxed.

The foregoing description of the preferred embodiment has been presented for purposes of illustration and description. It is not intended to be exhaustive or to limit the invention to the precise form described, and obviously many other modifications are possible in light of the above teaching. The embodiment was chosen in order to explain most clearly the principles of the invention and its practical applications thereby to enable others in the art to utilize most effectively the invention in various other embodiments and with various other modifications as may be suited to the particular use contemplated. It is intended that the scope of the invention be defined by the claims appended hereto.

We claim:

1. The method of making a multistrand Rutherford-type cable, comprising:
   (a) winding a plurality of wire strands helically and in a single layer around a fixed forming mandrel,
   (b) twisting selected of said strands in one direction about the lengths thereof and twisting selected of said strands in the opposite direction, about the lengths thereof, all prior to winding said strands around said mandrel,
   (c) flattening said helically wound strands into a flat multistrand ribbon having two generally flat sides, two edges and two layers of strands.

2. The method as set forth in claim 1 wherein each strand is twisted about its length in the direction opposite to the direction of twisting of the strands which are adjacent thereto when said strands are wound on said mandrel.

3. The method as set forth in claim 2, wherein the amount of twisting of each strand is equal to the amount of the opposite twisting of the strands which are adjacent thereto.

4. The method as set forth in claim 1, and further including providing a rotating turret coaxial with the length of said forming mandrel, supporting a plurality of wire spools around the perimeter of said turret, each spool having one of said strands wound thereon, rotating said spools around axes in a plane perpendicular to the axis of said turret to unroll said strands from said spools, guiding said strands from said spools to said mandrel, and wherein said twisting step comprises rotating said spools around axes parallel to the axis of said turret.

5. The method as set forth in claim 4, wherein said spools are rotated about axes parallel to the axis of said turret with selected of said spools being rotated in one direction relative to said turret and with the other of said spools being rotated in the opposite direction relative to the turret and with the speed of rotation of said spools relative to said turret being different in the two directions of rotation to compensate for the rotation of said turret so that all of the said strands will have the same degree of twist about their lengths when they arrive at said mandrel.

6. Apparatus for making multi-strand cable comprising:
   a generally planar turret having an axis,
   means mounting said turret for rotation about its axis,
   turret drive means for rotating said turret,
   a plurality of spool holders mounted on said turret with each spool holder being rotatable about an axis parallel to said turret axis,
   a plurality of spools of wire mounted in selected of said spool holders,
   a fixed forming mandrel positioned axially of and spaced from said turret,
   guide means mounted on said turret for rotation therewith for guiding wires from said spools to said fixed forming mandrel,
   spool drive means for rotating selected of said spool holders in one direction about their axes and for rotating selected others of said spool holders in the opposite direction about their axes.

7. Apparatus as set forth in claim 6, wherein said guide means functions to guide wires from alternate spools into adjacency with each other at said forming mandrel, and wherein said spool drive means functions to rotate every other spool holder in one direction relative to said turret and to rotate the other spool holders in an opposite direction relative to said turret.

8. Apparatus as set forth in claim 7, wherein said spool drive means functions to rotate all of said spool holders in one direction at the same rate relative to said turret, and to rotate all of said spool holders in the opposite direction at a different rate relative to said turret.

9. Apparatus as set forth in claim 6, wherein said spool drive means includes means responsive to rotation of said turret for rotating said spool holders.

10. Apparatus as set forth in claim 6, wherein said spool drive means includes:
    a fixed sun sprocket coaxial with said turret,
    first and second planet sprockets carried by said turret and driven by said sun sprocket,
    a shaft secured to each of said spool holders, said shafts being journaled in said turret for rotation about axes parallel to the axis of said turret,
    a first set of drive sprockets fixed, one each, to every other of said spool holder shafts,
    a second set of drive sprockets fixed, one each, on each of the other of said spool holder shafts,
    a first endless drive chain trained around all of said first set of drive sprockets,
    first chain drive means for driving said first endless drive chain at a predetermined linear rate in response to rotation of said first planet sprocket,
    a second endless drive chain trained around all of said second set of drive sprockets,
    second chain drive means for driving said second endless drive chain at a predetermined linear rate in response to rotation of said second planet sprocket.

11. Apparatus as set forth in chain 10 wherein said second chain drive means drives said second endless drive chain at a different linear rate than that at which said first endless drive chain is driven by said first chain drive means.

* * * * *